United States Patent [19]

Baba et al.

[11] Patent Number: 4,924,171
[45] Date of Patent: May 8, 1990

[54] SYSTEM FOR SUPPLYING POWER SOURCE BY ELECTROMAGNETIC INDUCTION COUPLING

[75] Inventors: Fujio Baba, Tokyo; Kunihiko Takeuchi, Kawasaki; Shinichi Horinouchi, Tokyo, all of Japan

[73] Assignee: Tokyo Keiki Co., Ltd., Tokyo, Japan

[21] Appl. No.: 254,687

[22] Filed: Oct. 7, 1988

[30] Foreign Application Priority Data

Oct. 8, 1987 [JP] Japan .................. 62-254331
Jan. 26, 1988 [JP] Japan .................. 63-015155

[51] Int. Cl.⁵ .............................. H02J 1/00
[52] U.S. Cl. .................. 323/347; 323/264; 235/493
[58] Field of Search ............ 363/74, 75; 323/250, 323/264, 331, 347; 235/380, 382.5, 449, 451, 487, 492, 493; 340/825.15, 825.33, 825.34, 825.35, 505

[56] References Cited

U.S. PATENT DOCUMENTS 3,555,405 1/1971 Martin .................................. 323/347
4,029,945 6/1977 Yamada et al. ................. 235/450 X
4,540,931 9/1985 Hahn .................................... 323/264
4,650,981 3/1987 Foletta ........................... 235/493 X
4,795,898 1/1989 Bernstein et al. .................... 235/487
4,797,541 1/1989 Billings et al. .................. 235/493 X Primary Examiner—Patrick R. Salce
Assistant Examiner—Kristine Peckman
Attorney, Agent, or Firm—Wenderoth, Lind & Ponack

[57] ABSTRACT

Between two units which are separately arranged, a power source signal is supplied from one of the two units to the other unit via electromagnetic induction coupling by using induction coils, and data signals are mutually transmitted and received between both of the units. A change in coupling distance between the induction coils provided for the two units is detected from a signal level of a reception signal from the unit which receives the power supply. When the reception signal level decreases, the signal level of the power supply signal is increased.

5 Claims, 6 Drawing Sheets

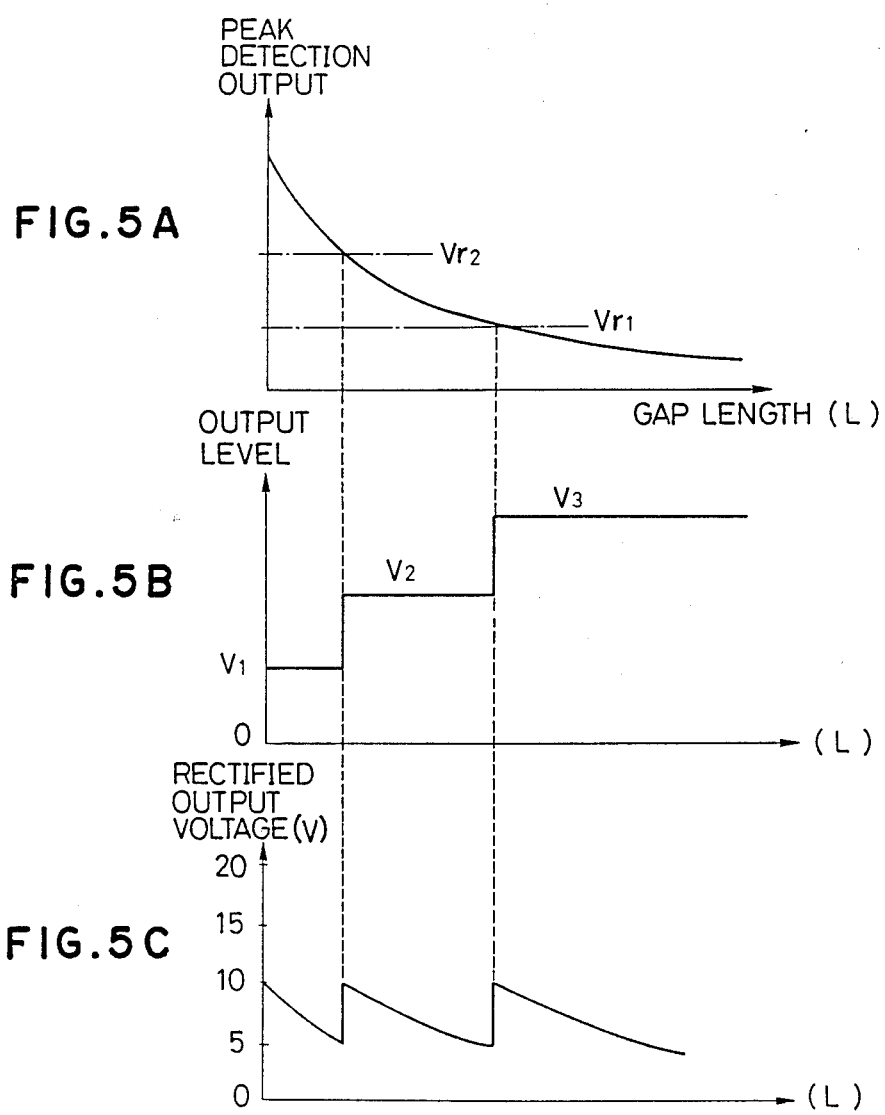

SYSTEM FOR SUPPLYING POWER SOURCE BY ELECTROMAGNETIC INDUCTION COUPLING

FIELD OF THE INVENTION

The present invention relates to a power supply system for supplying a power source from one unit to another unit using electromagnetic induction coupling by providing induction coils between the two separately arranged units.

RELATED ART STATEMENT

The inventors of the present invention have already filed U.S. patent application Nos. 048,632 (1987, now U.S. Pat. No. 4,821,198), 141,222 (1988), now U.S. Pat. No. 4,855,994, and 143,706 (1988) as prior inventions of the present invention.

In these prior inventions, a system is proposed in which a memory module is provided as an independent unit for a reader/writer and information stored in the memory module is written or read out by the reader/writer in contactless manner by a magnetic induction coupling. Furthermore, in this system, a power source is supplied from the reader/writer to the memory module in a contactless manner using electromagnetic induction coupling.

FIG. 1 shows an example of a memory module system which has already been proposed by the inventors of the present invention. This system comprises a reader/writer 10 and a packaged memory module 12.

The reader/writer 10 has a controller 14 to control the writing and reading operations. For example, in the case of writing data into the memory module 12, the controller 14 outputs to a multiplexer 16 the information which is read out of a tape reader or the like connected as an external unit. Then, the multiplexer 16 converts the input information to frequency signals of oscillating frequencies $f_1$ and $f_2$ of sine wave oscillators 18 and 20. That is, the frequency $f_1$ is selected when a bit "1" is sent from the controller 14. The frequency $f_2$ is selected when the bit "0" is sent from the controller 14. The frequency converted signal from the multiplexer 16 is amplified by a power amplifier 22 and then supplied to an induction coil 24-1 for transmission. The induced magnetic field corresponding to the frequency signal is supplied to the memory module 12.

The memory module 12 has an induction coil 24-2 for reception. A frequency signal induced in the induction coil 24-2 is rectified by a rectifying circuit 26 and set to a constant DC voltage of, e.g., 5 V by a constant voltage circuit 28. A power source is supplied to each circuit section in the memory module 12. Furthermore, the frequency signal induced in the induction coil 24-2 is demodulated by a demodulator 30 in a manner such that the frequency $f_1$ is set to the bit "1" and the frequency $f_2$ is set to the bit "0". This demodulated signal is input to a memory controller 32, thereby writing information into a non-volatile memory 34 using an EEPROM or the like.

On the other hand, to read out data from the memory module 12, in a manner similar to the data writing mode, a read control signal is sent from the reader/writer 10 to the memory module 12 by electromagnetic induction coupling using the induction coil 24-1. The signal is transmitted through the memory controller 32 and frequency modulated into an oscillating frequency $f_3$ of a frequency oscillator 38 and a signal of a frequency 0 by the control of a multiplexer 36 on the basis of bit information which is read out of the memory 34. These FM signals are supplied to an induction coil 40-1 for transmission. An induction coil 40-2 for reception is provided on the side of the reader/writer 10 for the induction coil 40-1. The frequency signal induced in the induction coil 40-2 is amplified by a demodulator 42 and, thereafter, it is demodulated into the bit "1" for the frequency $f_3$ and into the bit "0" for the frequency 0. The demodulated signal is given to the controller 14.

In such a memory module system, for an increase in gap length (L) between the reader/writer 10 and the memory module 12, there is a relation such that the intensity of the magnetic field due to the electromagnetic induction coupling decreases in inverse proportion to the square of the distance. Therefore, as shown in FIG. 2, the rectified voltage which is obtained by the rectifying circuit 26 in the memory module 12 has a characteristic such that although it is set to, e.g., 35 V when the reader/writer 10 and memory module 12 are come into contact therewith, this voltage is reduced with an increase in gap length (L).

On the other hand, as the constant voltage circuit 28 provided in the memory module 12, a regulator is generally used. Assuming that the output voltage of the rectifier 26 fluctuates within a range of, e.g., 35 to 7 V in correspondence to a change in gap length (L) in a range from 0 mm to ($L_1$) mm, a constant voltage circuit 28 having a performance such that a constant output $V_c = 5$ V is obtained for a rated input voltage in a range from 7 to 35 V must be used.

However, in the case where the output voltage of the rectifying circuit 26 largely fluctuates in dependence on the gap length (L), the rectifying circuit 26 using relatively expensive circuit parts must be used as a rectifier for use in an information processing apparatus which can endure the maximum rectified voltage of, for instance, 35 V when the gap length (L) has the minimum value. On the other hand, a regulator having a wide rated input voltage also needs to be used. Thus, there are problems such that the circuit arrangement of the constant voltage circuit 28 is complicated and its cost rises.

SUMMARY OF THE INVENTION

It is an object of the present invention to provide a system for supplying a power source using electromagnetic induction coupling in which even if a coupling distance of the magnetic induction coupling between two units changes, a fluctuation in output voltage of a rectifying circuit provided in the unit to receive the power supply can be suppressed.

Another object of the invention is to provide a system for supplying a power source using electromagnetic induction coupling in which when a signal level of a reception signal transmitted from a memory module using electromagnetic induction coupling decreases, a signal level of a power supply signal to the memory module is increased.

Still another object of the invention is to provide a system for supplying a power source using electromagnetic induction coupling in which a signal level of a power supply signal is increased in accordance with a decrease in the amplitude detection signal of a reception signal from a memory module.

Still another object of the invention is to provide a system for supplying a power source using electromagnetic induction coupling in which a signal level of a power supply signal is increased step by step for a decrease in reception signal from a memory module.

That is, according to the invention, there is provided a system in which between two units which are separately arranged, for instance, a reader/writer and a memory module, a power source is supplied from one unit to the other unit using electromagnetic induction coupling by providing induction coils and at the same time, a data signal is transmitted and received between both of the units.

The level of the reception signal changes in accordance with the coupling distance (gap length) of the magnetic induction coupling between the two units. The reception signal level is detected by detecting the peak level or amplitude of the reception signal. When the detection level decreases, it is determined that the coupling distance has increased, thereby raising the signal level for the power supply. On the contrary, when the reception signal level increases, it is decided that the coupling distance has decreased, thereby reducing the signal level of the power supply signal.

For example, in the case of supplying a power source from the reader/writer to the memory module, the signal level, e.g., peak level of the reception signal from the memory module using magnetic induction coupling is detected, and since the peak level decreases with an increase in gap length, the signal level for the power supply is increased with a decrease in the detected peak level (with an increase in distance). Therefore, even if the gap length changes, the rectified output which is almost within a constant range can be derived from the rectifying circuit in the memory module. Consequently, there is no need to use circuit parts of a high withstanding voltage in the power supply circuit of the memory module. On the other hand, a constant voltage circuit such as a switching regulator or the like of a narrow rated input range can be used.

The above and other objects, features, and advantages of the present invention will become more apparent from the following detailed description in conjunction with the accompanying drawings.

BRIEF DESCRIPTION OF THE DRAWINGS

FIG. 5A is a characteristic diagram showing a peak detection output in relation to a gap length;

FIG. 5B is a characteristic graph showing an output level of a power supply signal which is changed in a step by step basis in relation to a gap length;

FIG. 5C is a characteristic graph showing an output voltage of a rectifying circuit in relation to a gap length.

DETAILED DESCRIPTION OF THE PREFERRED EMBODIMENTS

Figure 1:
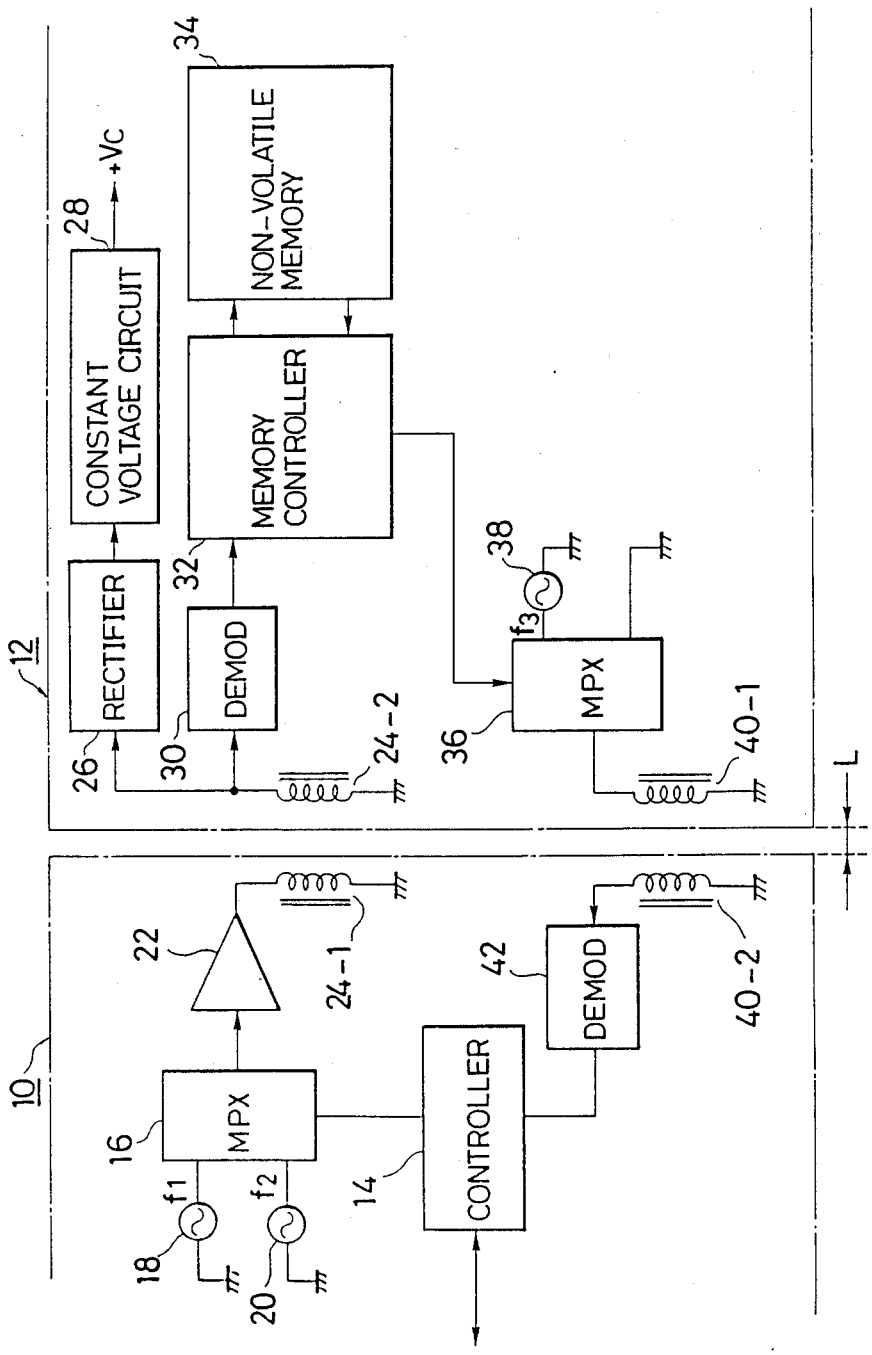
FIG. 1 is a circuit block diagram of a conventional system.
Figure 2:
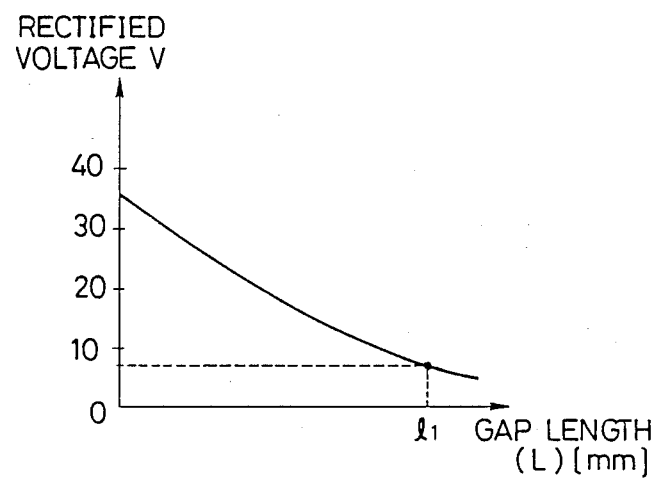
FIG. 2 is a characteristic graph of a rectified output in relation to a gap length.
Figure 3:
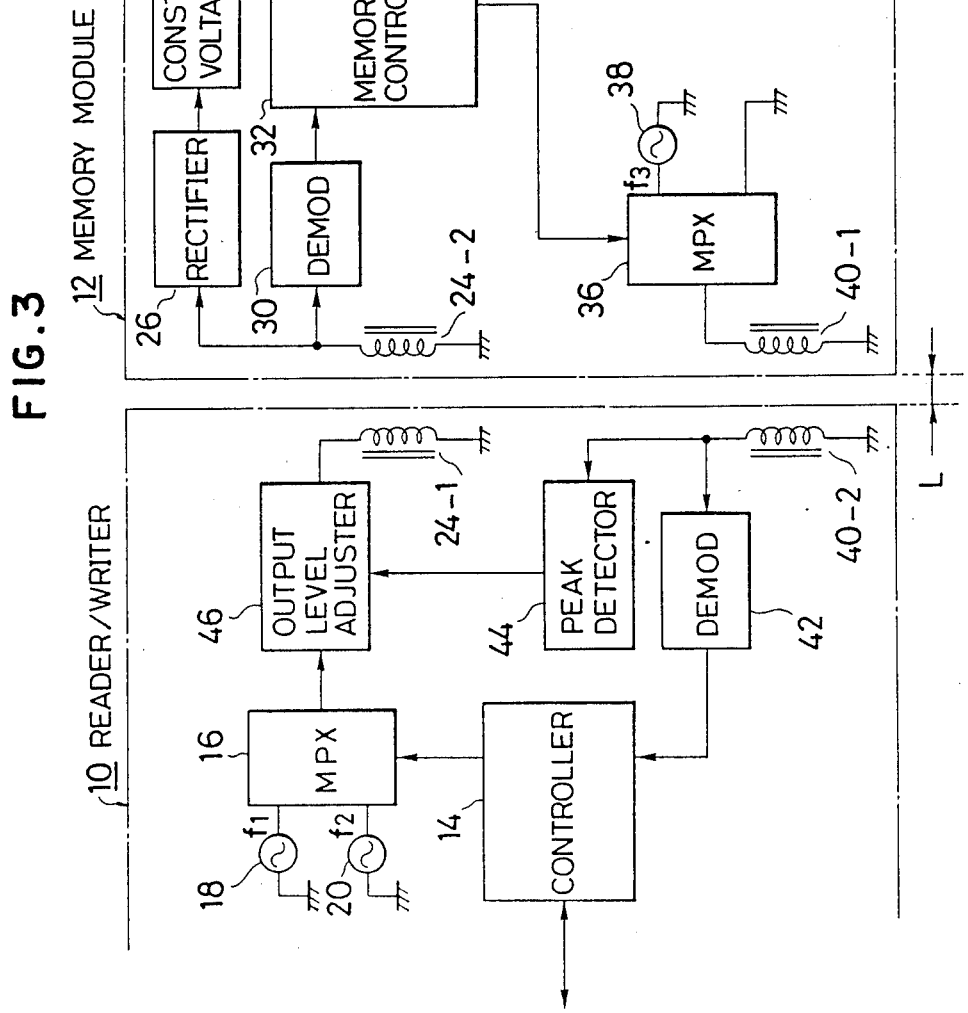
FIG. 3 is a circuit block diagram showing an embodiment of the present invention.

Referring now to FIG. 3, reference numeral 10 denotes the reader/writer and reference number 12 denotes the memory module. The reader/writer 10 includes the induction coil 24-1 for transmission to supply a power source to the reader/writer 10 and to transmit a data signal to the memory module, and the induction coil 40-2 for reception to receive a signal from the memory module 12. The induction coil 24-2 for reception to receive the power source and signal and the induction coil 40-1 for transmission to transmit a data signal to the reader/writer 10 are provided in the memory module 12 so as to face the induction coils 24-1 and 40-2 in the reader/writer 10, respectively. In this case, since the induction coils 24-1 and 24-2 transmit both the power source signal and the data signal, diameters of the magnetic cores and coils are set to large values, thereby enabling the strong induction field to be generated. On the other hand, the induction coils 40-1 and 40-2 are used only for signal transmission. Therefore, a coil of a small diameter is wound around a small magnetic core and used as each of the induction coils 40-1 and 40-2.

In a manner similar to the foregoing conventional system, the reader/writer 10 includes a multiplexer 16 to frequency modulate the information bits from the controller 14 for the write/read control into the oscillating frequencies $f_1$ and $f_2$ from the sine wave oscillators 18 and 20, and the demodulator 42 for amplifying the signal from the memory module side which was induced in the induction coil 40-2 and for demodulating into the bit "1" for the frequency $f_3$ and into the bit "0" for the frequency 0. Further, in a manner similar to the foregoing conventional system, the memory module 12 includes a rectifying circuit 26 to rectify the frequency signal induced in the induction coil 24-2; a constant voltage circuit 28 which receives a rectified output of the rectifying circuit 26 and supplies a constant DC voltage $V_c$ of, e.g., 5 V as a power source to each circuit section in the memory module; a demodulator 30 to demodulate the frequency signal induced in the magnetic induction coil 24-2 into the bit "1" for the frequency $f_1$ and into the bit "0" for the frequency $f_2$; a memory controller 32; a non-volatile memory 34 consisting of an EEPROM or the like; and a multiplexer 36 to modulate the data bit read out of the memory 34 into the frequency signal of the oscillating frequency $f_3$ of the frequency oscillator 38 and to supply to the induction coil 40-1.

Moreover, in this invention, the reader/writer 10 also has a peak detecting circuit 44 to detect a peak level of the reception signal from the memory module 12 which was induced in the induction coil 40-2. A detection output of the peak detecting circuit 44 is given as a control signal to an output level adjusting circuit 46. The output level adjusting circuit 46 amplifies a frequency signal from the multiplexer 16 and supplies the thus amplified signal to the induction coil 24-1.

In other words, the frequency signal which is supplied to the induction coil 40-1 from the multiplexer 36 in the memory module 12 has a predetermined signal level (constant amplitude level). Therefore, the signal level of the frequency signal induced in the induction coil 40-2 of the reader/writer 10 decreases with an increase in gap length (L). Namely, the intensity of the magnetic field due to the induction coupling between the induction coils 40-1 and 40-2 decreases in inverse proportion to the square of the coupling distance as the gap length (L). Therefore, the peak value which decreases with an increase in gap length (L) can be detected by detecting the peak level of the frequency signal induced in the induction coil 40-2 by the peak detecting circuit 44.

The detection output of the peak value which decreases in accordance with an increase in gap length (L) and was detected by the peak detecting circuit 44 is used as a control signal of the output level adjusting circuit 46, thereby performing the level adjustment to raise the output level to the induction coil 24-1 in response to a decrease in the peak value detection output.

As a practical example of the output level adjusting circuit 46, it can be realized by using an amplifier with an automatic gain control function and by setting a detection output of the peak value detecting circuit 44 to an AGC control signal. On the other hand, it is also possible to perform the level adjustment to increase the output level with a decrease in peak value by controlling a variable impedance device such as an FET or the like provided in the output level adjusting circuit 46 by the peak value detecting circuit 44.

The operation shown in the embodiment of FIG. 3 will now be described.

Figure 4A:
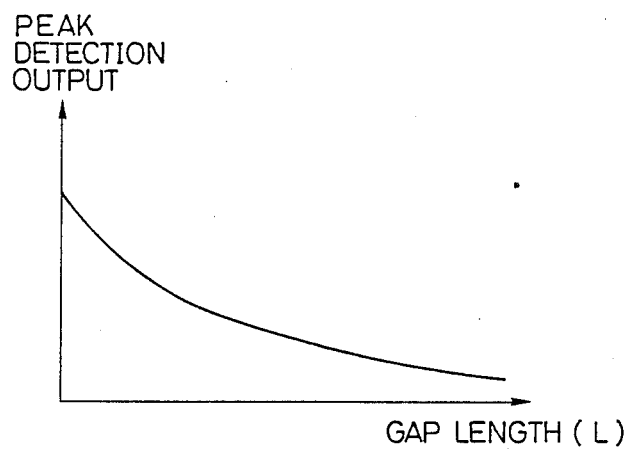
FIG. 4A is a characteristic graph showing a peak detection output in relation to a gap length.
Figure 4B:
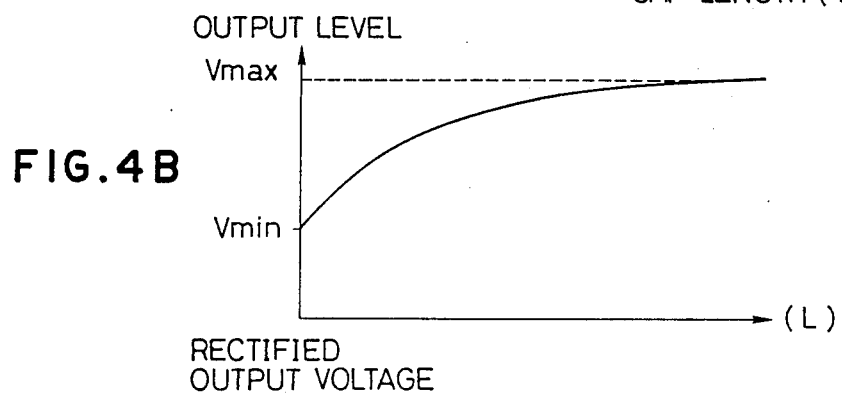
FIG. 4B is a characteristic graph showing an output in relation level of a power supply signal to a gap length.
Figure 4C:
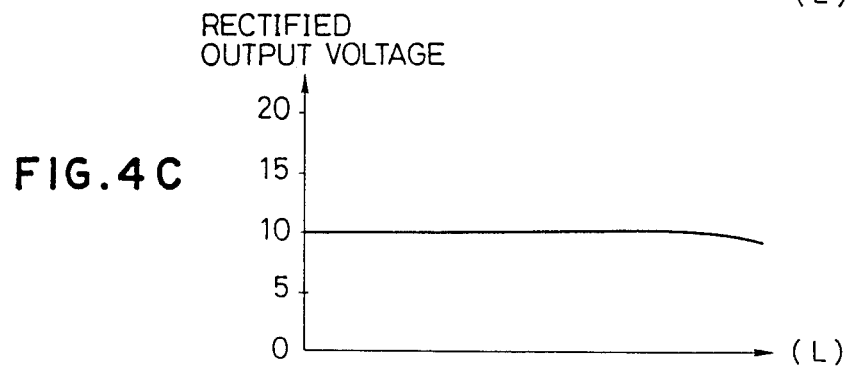
FIG. 4C is a characteristic graph showing an output in relation voltage of a rectifying circuit to a gap length.

FIG. 4A shows a change in detection output of the peak detecting circuit 44 to the gap length (L). FIG. 4B shows a change in output voltage of the output level adjusting circuit 46 based on the peak value detection output to the gap length (L). FIG. 4C shows a change in output voltage of the rectifying circuit 26 provided in the memory module 12 to the gap length (L).

As will be obviously understood from these characteristic graphs of FIGS. 4A to 4C, when the gap length (L)=0, the signal level of the frequency signal induced in the induction coil 40-2 becomes maximum. In response to the detection output of the peak detecting circuit 44 at this time, the output level adjusting circuit 46 sets the output level to the induction coil 24-1 to the minimum level $V_{min}$.

Next, when the gap length (L) increases, as shown in FIG. 4A, the peak detection output of the peak detecting circuit 44 decreases. In response to the peak detection output, the output voltage of the output level adjusting circuit 46 increases as shown in FIG. 4B. Therefore, the frequency signal induced from the induction coil 24-1 to the induction coil 24-2 is always held to an almost constant level even if the gap length (L) increases. Thus, as shown in FIG. 4C, the output voltage of the rectifying circuit 26 can be held to a constant level relative to an increase in gap length (L).

FIGS. 5A to 5C are characteristic graphs showing other control characteristics which are set to the output level adjusting circuit 46 in FIG. 3.

That is, in the output characteristic of the output level adjusting circuit shown in FIG. 4B, the output level is adjusted so that the output voltage of the rectifying circuit 26 is always constant in accordance with the peak value detection output. However, to obtain such a control characteristic, the arrangement of the output level adjusting circuit 46 becomes complicated. Therefore, in the case of the control characteristic of FIG. 5B, the circuit arrangement is simplified by dividing the control level of the output level adjusting circuit 46 into three levels and the level adjustment is executed on the basis of these three levels.

That is, threshold values $V_{r1}$ and $V_{r2}$ are set in the output level adjusting circuit 46 for the peak value detection output in FIG. 5A which is given from the peak value detecting circuit 44. When the peak value detection output is lower than the threshold value $V_{r1}$, as shown in FIG. 5B, the output level adjusting circuit 46 sets the output level to a predetermined voltage $V_3$. When the peak value detection output is the threshold value $V_{r1}$ or more and less than $V_{r2}$, the output level is set to a predetermined voltage $V_2$. When the peak detection output is the threshold value $V_{r2}$ or more, the output level is set to a predetermined voltage $V_1$. In this manner, the output level is adjusted at three levels.

In the case of adjusting the output level at three levels in accordance with the gap length (L), as shown in FIG. 5C, the output voltage of the rectifying circuit 26 changes every output level so as to decrease within a range, e.g., from 5 V to 10 V in accordance with an increase in gap length (L). However, a fluctuating range of the rectified output of the rectifying circuit 26 can be held in a rated input range such as not to practically cause a problem in consideration of a regulator constituting the constant voltage circuit 28.

Although the embodiment of FIG. 5B has been described with respect to the example in the case of controlling the output level to three levels, the present invention is not limited to this case but can be also applied to a multi-level control such as two or four or more levels.

Figure 6:
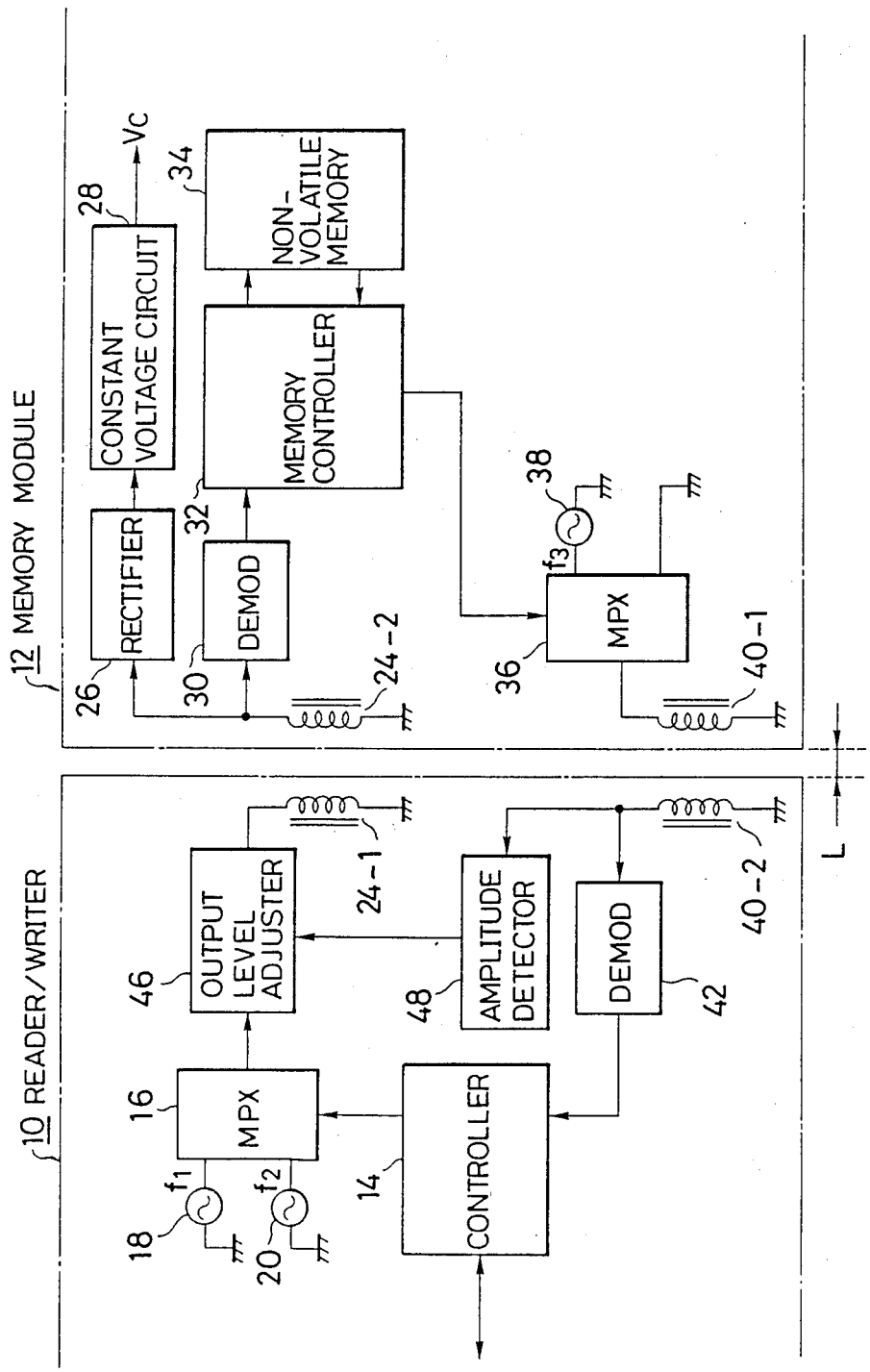
FIG. 6 is a circuit block diagram showing another embodiment of the invention.

FIG. 6 is a circuit block diagram showing another embodiment of the present invention.

It is a feature of this embodiment that an amplitude detecting circuit 48 is provided in place of the peak detecting circuit 44 in the embodiment of FIG. 3. For instance, an envelope detector is used as the amplitude detecting circuit 48. The output level adjusting circuit 46 is controlled by a detection output of the amplitude detecting circuit 48 in a manner similar to the embodiment of FIG. 3. The arrangement other than the amplitude detecting circuit 48 is substantially the same as that in the embodiment of FIG. 3.

As described above, according to the invention, even when a gap length between the units which perform the electromagnetic induction coupling changes, the output voltage of the rectifying circuit provided on the side of the unit to receive the power supply can be held to a predetermined value or can be suppressed to a value within a predetermined range for a change in distance. Therefore, it is possible to eliminate problems such as a thermal loss of the constant voltage circuit and a withstanding voltage of the parts in the case where the rectified output which is larger than it is needed is derived when the gap length is small. On the other hand, since it is sufficient that the rated input range of the constant voltage circuit is narrow, the circuit arrangement is simplified. A less expensive power supply with less energy loss can be realized.

Further, among the regulators having narrow rated input voltages, there is a regulator in which a potential difference between the input voltage and the output voltage is low. A regulator having an input voltage lower than those in the conventional regulators can be used. That is, even if an output voltage from the rectifying circuit is low, the regulator can operate. In other words, the distance between the reader/writer and the memory module can be further enlarged.

The above embodiment relates to the example of the power supply between the reader/writer and the memory module. However, the invention is not limited to this example but can be also applied to other proper systems in which information is transmitted and received between two units in a contactless manner by the electromagnetic induction coupling.

What is claimed is:

1. A transmitter/receiver apparatus, said apparatus transmitting a power supply signal via electromagnetic induction coupling to a device, and said apparatus receiving a signal via electromagnetic induction coupling from said device, said apparatus and said device having a coupling distance therebetween, said apparatus comprising:

coupling distance detecting means for detecting said coupling distance in accordance with a magnitude of said received signal, said magnitude changing in accordance with a change in said coupling distance; and power supply signal level control means, operatively coupled to said coupling distance detecting means, for setting a signal level of said power supply signal in accordance with said coupling distance detected by said coupling distance detecting means.

2. An apparatus according to claim 1, wherein said coupling distance detecting means includes a peak level detecting means for detecting a peak level of said received signal.

3. An apparatus according to claim 1, wherein said coupling distance detecting means includes an amplitude detecting means for detecting an amplitude level of said received signal.

4. An apparatus according to claim 1, wherein said power supply signal level control means includes means for controlling said signal level of said power supply signal such that a change of said signal level is inversely proportional to a change of said magnitude of said received signal.

5. An apparatus according to claim 1, wherein said power supply signal level control means includes means for increasing said signal level of said power supply signal on a step by step basis in accordance with a decrease in said magnitude of said received signal.

* * * * *